United States Patent [19]

Pontow

[11] Patent Number: 5,151,062

[45] Date of Patent: Sep. 29, 1992

[54] APPARATUS FOR TURNING OVER FISH FILLETS

[75] Inventor: Hugo Pontow, Lübeck, Fed. Rep. of Germany

[73] Assignee: Nordischer Maschinenbau Rud. Baader GmbH & Co. KG, Lubeck, Fed. Rep. of Germany

[21] Appl. No.: 725,687

[22] Filed: Jul. 3, 1991

[30] Foreign Application Priority Data

Jul. 14, 1990 [DE]  Fed. Rep. of Germany ....... 4022451

[51] Int. Cl.$^5$ ................................................ A22B 3/08
[52] U.S. Cl. ................................... 452/179; 452/177; 452/180
[58] Field of Search ............... 452/179, 177, 180, 182, 452/183

[56] References Cited

U.S. PATENT DOCUMENTS

| | | | |
|---|---|---|---|
| 1,689,919 | 10/1928 | Heath | 452/179 |
| 3,315,299 | 4/1967 | Danielsson | 452/179 |
| 4,571,778 | 2/1986 | Sawusch et al. | 452/179 |
| 4,692,965 | 9/1987 | Stephenson | 452/179 |

Primary Examiner—Bruce M. Kisliuk
Assistant Examiner—Lawrence Cruz
Attorney, Agent, or Firm—Fay, Sharpe, Beall, Fagan, Minnich & McKee

[57] ABSTRACT

An automatically functioning turn-over apparatus for fish fillets, which may be arranged subsequent to a fish filleting machine, has a guiding channel for the fillets arranged at an inclination to slope in the conveying direction of the fillets. In its end portion the guiding channel has a run-off edge arranged obliquely to the longitudinal axis of the channel, while below the latter a correspondingly inclined collecting chute having a semi-circular or oval-arch-shaped cross-section is arranged such that the run-off edge faces a side-wall of the collecting surface forming a guiding face, which is arranged at a distance to the run-off edge so as to allow the passage of the fillets.

9 Claims, 2 Drawing Sheets

APPARATUS FOR TURNING OVER FISH FILLETS

BACKGROUND OF THE INVENTION

1. Field of the Invention

The invention relates to an apparatus for automatically turning over fish fillets from one of their main surfaces to the other, the apparatus comprising means for supplying the fillets to be turned over and means for discharging the fillets when they have been turned over.

In the processing of fish, particularly bulk fish with the aim of gaining fish products appropriate for human nutrition it is conventional practice these days to perform such processing in a mechanical manner, in particular in a fully automatic manner. The most common processing product is in the form of a fish fillet, which is gained by means of fish filleting machines which normally produce single or double fillets including the skin. When fillets are required without skin this may be removed by fillet skinning machines.

For reasons of economy of such treatment it is desirable for example to combine the processing steps in one automatic process by interlinking the necessary single machines or machine units to form one total installation. Such linking is, however, only possible if fillets which leave the filleting machine normally lying on their meat side are turned over, since the usual, proved and reliable skinning systems require a supplying of the fillets with their skin facing downwardly.

2. Prior Art

Various devices are known which enable such a turning over of the fillets.

Norwegian Patent 108 848 discloses a device in which a reversibly driven conveyor belt is used above which a further conveyor belt supplying the fillets ends, is provided the distance between the belts being smaller than the length of the fillets to be handled. In the end region of the first conveyor belt there is arranged a switching or controlling device which can be displaced by the fillets and makes the lower transport belt run in a counterdirection when activated and run in the same direction in the rest position. In this manner it is achieved that the fillets are turned with regard to their lateral and longitudinal directions.

Such known device does by no means cope with today's requirements regarding efficiency.

Furthermore, a device for crumbling foodstuffs is known from U.S. Pat. No. 3 860 105. This device comprises a region in which the crumbled foodstuff performs a somersault by being thrown from one conveyor onto another one arranged therebeneath. The aim of such action is to shake off any excess crumbs which may be present e.g. by way of aggregations in hollow spaces of such foodstuffs.

Also, there is disclosed by WO 89/07892 a turning device for fish fillets which are turned from a conveyance in the direction of their longitudinal axis to a direction transverse thereto and simultaneously from the skin side onto the meat side. This action occurs at the deflection or reversing point of a conveyor-belt conveying the fish fillets, which are thrown down onto a transverse slide or chute upon performance of a somersault, from which chute they are supplied to a second conveyor-belt which is arranged transverse to the first conveyor-belt.

Finally, there is disclosed in German OS (Published Patent Application) 38 38 154 a turning over and stretching device for fish fillets, in which device the turning over is performed by way of somersaulting which is imposed on the fish fillets through their transfer from one conveyor-belt to another one arranged below.

The principle of somersaulting has not proved a success in the practice of process performance on board of ships because a perfect function essentially depends, among other parameters, on a defined effectiveness of gravity, which prerequisite is not guaranteed in the case of even only slightly rough seas.

SUMMARY OF THE INVENTION

1. Objects of the Invention

It is therefore the major object of the present invention to suggest a turn-over apparatus of improved operability and construction.

It is a particular and most important object of the present invention to suggest an apparatus which can be manufactured at low expenditure and has a compact structure.

It is a further essential object of the present invention to suggest a turn-over apparatus which guarantees a safe function at high yield even when used on board vessels.

2. Gist of the Invention

In an apparatus comprising a fillet supplying arrangement and a fillet discharging arrangement for removing turned over fillets towards further processing, these objects are achieved in that for supplying the fillets there is provided a guiding channel arranged inclined so as to support the movement of the fillets by gravity from a starting end of the channel to a run-off end thereof, which channel has, in its end region, a run-off edge; that the run-off edge starts from one longitudinal edge of the channel to extend at least into the proximity of the opposing longitudinal edge without following the shortest distance between these edges; and that there is provided a guiding face associated with the run-off edge at a distance thereto and extending essentially in the direction of the longitudinal axis of the guiding channel, this guiding face being arranged to extend underneath the guiding channel when seen in a vertical direction, and also arranged at an inclination. This arrangement makes sure that the fillets are not turned by mere somersaulting but are rather transferred onto the guiding face by means of a related arrangement of the channel and the face with regard to their inclination and spacing such that the fillets' contact with the guiding channel is still partially maintained when they already meet the guiding face, on which they may slide towards the conveyor for being discharged for further processing. Thus, the objects can be achieved by such apparatus in a very appropriate, inexpensive and reliable manner.

According to an advantageous embodiment of the present invention, a conveyor may be arranged subsequent to the functional end or lower region of the guiding face to form the discharge means, which conveyor may be arranged such that it can transport the turned over fillets either transversely or longitudinally with regard to the guiding face. In this manner, the turned fillets can be conveyed to the next processing station, e.g. a skinning device, at high speed and number.

Expediently, the guiding face may form part of a side-wall of a receiving chute which extends in the direction of the guiding channel and is inclined in the same sense as the guiding channel, so that, taking the combination of the guiding channel and the guiding face as a functional unit, there will be a continuous slope from the guiding channel via the guiding face to the discharge means, the receiving chute, at the same time, guaranteeing a reliable conveyance of the turned fillets.

In order to make sure that the turned over fillets can move unimpeded, the receiving chute may have a cross-section of a semi-circle or oval-arch shape and can have the form of a flushing chute, the movement of the fillets thus being supported by an appropriate fluid.

According to another preferred embodiment, the run-off edge of the guiding channel should smooth, and have no burrs and/or, where necessary, be appropriately rounded, so that the movement of the fillets over the edge may occur in an unimpeded manner.

BRIEF DESCRIPTION OF THE DRAWINGS

Other and further objects of the present invention will be apparent from the following description and claims and are illustrated in the accompanying drawings which by way of illustration schematically show preferred embodiments of the present invention and the principles thereof and what now are considered to be the best modes contemplated for applying these principles. Other embodiments of the invention embodying the same or equivalent principles may be used and structural changes may be made as desired by those skilled in the art without departing from the present invention and the scope of the appended claims. In the drawings

DETAILED DESCRIPTION OF THE PREFERRED EMBODIMENTS

Figure 1:
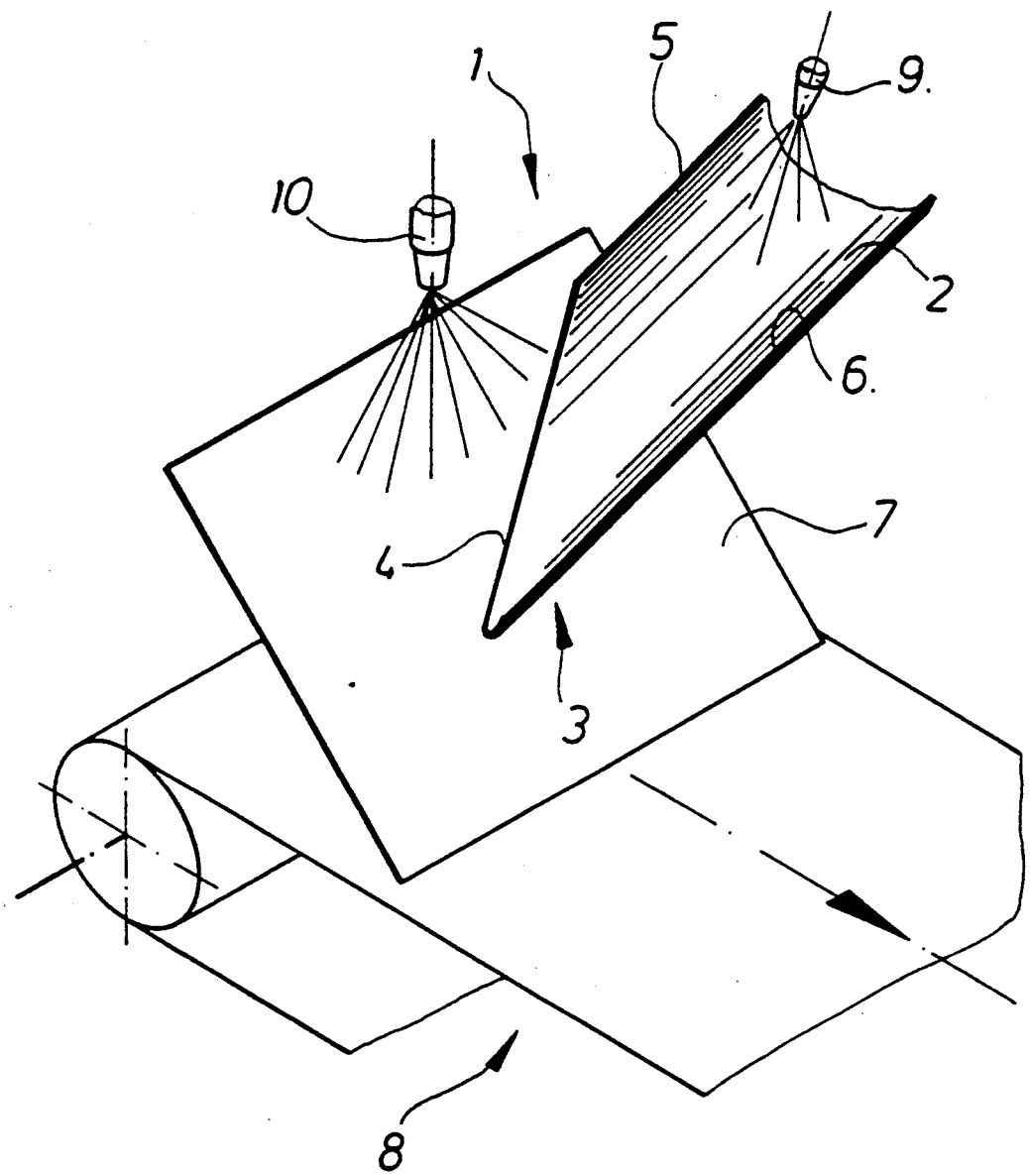
FIG. 1 shows a first embodiment of a turn-over apparatus according to the present invention including a conveyor for discharging the turned over fillets transversely to their longitudinal axis.

A turn-over apparatus 1 according to the present invention may be arranged in the non-shown discharge area of a filleting machine mounted on the frame thereof. This turn-over apparatus 1 includes, as shown in FIG. 1, a guiding channel 2 having an e.g. semi-elliptic cross-section and being arranged at an inclination and in a position as an extension of a filleting path of a filleting machine.

In the region of its lower end 3 the guiding channel 2 is cut off obliquely with respect to its longitudinal axis so as to have a run-off edge 4 which extends from a first longitudinal edge 5 of the guiding channel 2 up to at least the proximity of the other, second longitudinal edge 6. Associated with the run-off edge 4 and arranged at a distance thereto is a guiding face 7 which extends essentially in the direction of a longitudinal axis defined by the guiding channel 2 and is arranged at an inclination in the vertical dimension thus to extend underneath the guiding channel 2. A conveyor 8 is arranged following the lower edge of the guiding face 7. This conveyor may e.g. be a conveyor-belt whose running-off portion includes an obtuse angle with the guiding face 7. The guiding channel 2 as well as the guiding face 7 are wetted with water through appropriately arranged and aligned nozzles 9 and 10 issuing fluid jets.

Figure 2:
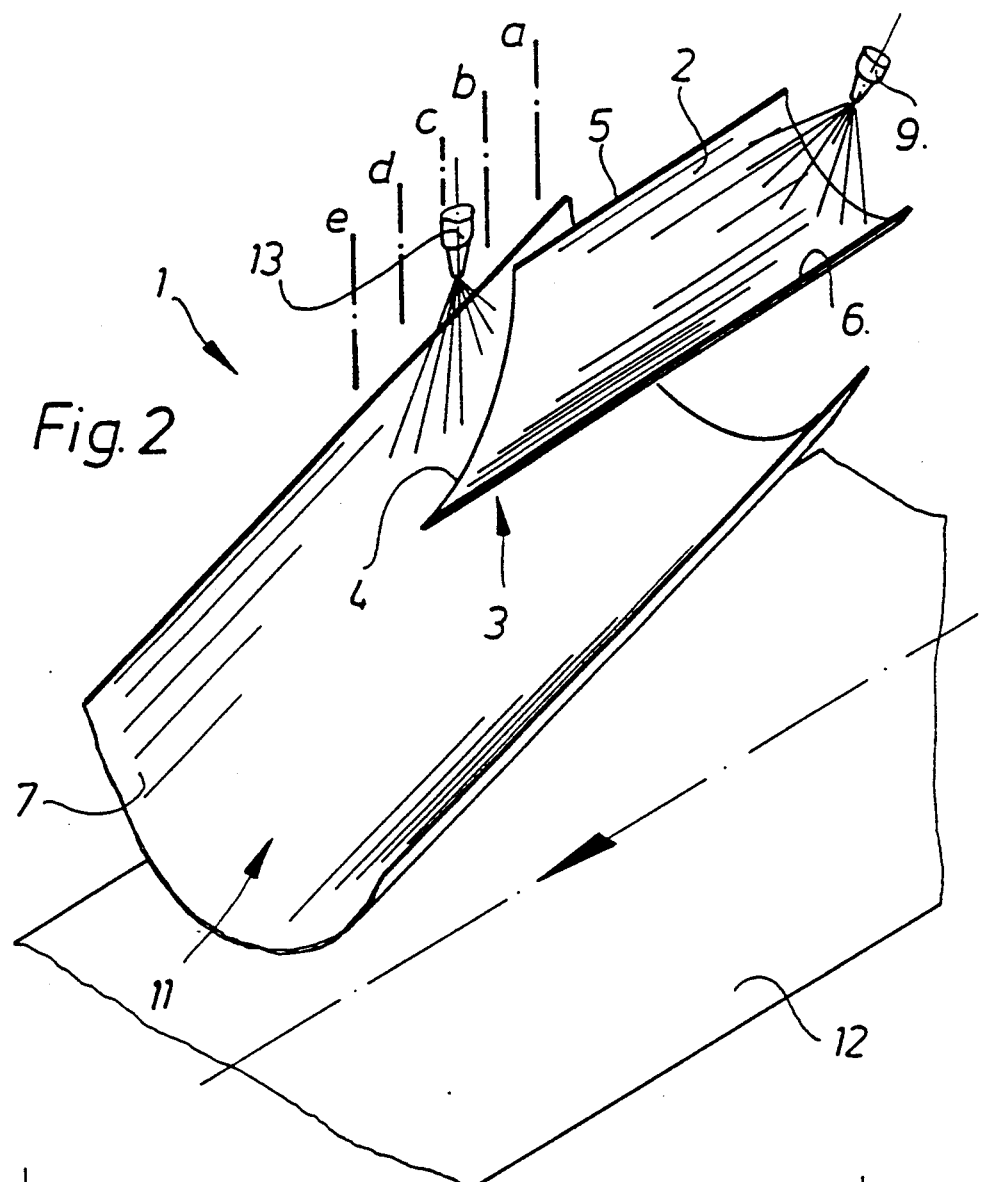
FIG. 2 shows a second embodiment of the present invention including a conveyor discharging the turned over fillets in the direction of their longitudinal axis.

As shown by the exemplified embodiment of FIG. 2 the guiding face 7 forms part of a collecting or receiving chute 11 which is arranged below the guiding channel 2. This chute 11 has a cross-section which may be oval-arch-shaped or parabolic-shaped, but can also form an appropriate part of a circle. The longitudinal axis of this collecting chute 11 is preferably aligned such that it extends non-parallel with the longitudinal axis of the guiding channel 2. The channel 2 and chute 11 are arranged such with regard to each other that the run-off edge 4 faces the inner surface of a side-wall of the collecting chute 11 while leaving a distance thereto, the inner surface defining the guiding face 7. A conveyor-belt 12 may be provided underneath the collecting chute 11, which conveyor can advantageously be advanced in the direction of the longitudinal axis of the chute 11 as shown by the arrow. As already mentioned in context with the embodiment of FIG. 1, nozzles 9 and 13 are provided for wetting the surfaces coming into contact with the fillets moving through this apparatus.

Figures 3A, 3B, 3C, 3D, 3E:
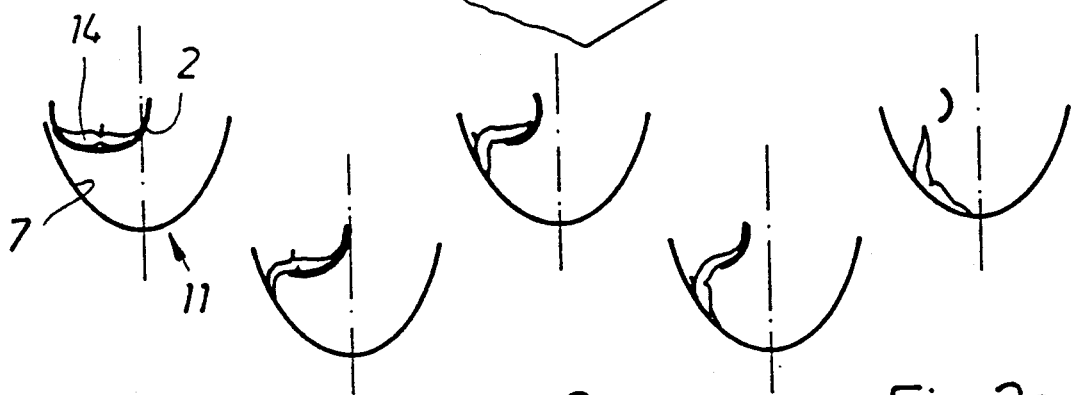
FIGS. 3a to 3e show simplified sectional representations of the apparatus of FIG. 2 according to the section lines a to e thereof.

The function of the turn-over apparatus is described in the following with specific regard to the embodiment shown in FIGS. 2 and 3:

A fish fillet 14 as indicated in FIGS. 3a–3e and having been delivered from a fish filleting machine normally arrives in the guiding channel 2 with a decapitation-cut face leading and lying on its meat side, i.e. with the skin side pointing upwardly, in which channel it is moved sliding on a water film while essentially maintaining its longitudinal alignment in the direction of its longitudinal axis. Thus, the fish fillet 14 reaches the area of the run-off edge 4. When taking the situation as shown in FIG. 2 with the oblique arrangement of the run-off edge 4, this is first passed by those fillet portions which lie to the right relative to the sliding direction. The softness of the fillet has the effect that those fillet portions which have passed the edge 4 and have thus lost their support by the guiding channel 2 will follow gravity and therefore assume a hanging position. This process carries on continuously as can be taken from the "slow motion" representation of FIGS. 3b–3e, in the sliding direction of the fillet from the right to the left, so that, following the progression of the advancing of the fillets all portions thereof will gradually assume a vertical position. (For the sake of easier understanding the representations of FIGS. 3a–3e are shown as "slice representations".) On increasing overhang beyond the run-off edge 4 the fillet finally contacts the opposing side-wall of the collecting chute 11 which now takes over progressively the support of the fillet by the skin side thereof. Owing to the kinetic energy inherent in the fillet and to the reduced friction obtained by the water the fillet thus arrives, following a helix-shaped path, in the bottom region of the collecting chute 11, so that it may now be moved, with its skin side facing downwardly towards the conveyor-belt 12 while supported by the water flushing, the speed of the conveyor-belt 12 being controlled or selected such that a stretching of the fillet is obtained during the transfer from the chute 11 to the conveyor 12.

The uprising portion of the collecting chute 11 first getting into contact with the fillet and opposing the run-off edge 4 of the guiding channel 2 forms the guiding face 7 and thus an integrated part of the chute 11. As is shown by the embodiment of FIG. 1, the collecting chute 11 may be substituted as such but with its side-wall being arranged plane to form the guiding face 7 in the manner of a sliding board or the like, the effect thereof being the same as that of the side-wall of the collecting chute 11. In this example of putting the invention into practice the continued transport of the fillet occurs transverse to its longitudinal axis. As can be gathered from this embodiment, the final position of the fillet can be influenced and varied depending on the relationship between the position of the conveyor 8 or 12 and the channel 2/face 7/ chute 11 arrangement.

What is claimed is:

1. An apparatus for the automatic turning over of fish fillets having two main surfaces from one of said surfaces onto the other one in order to bring said fillets into a desired position for further processing, the apparatus comprising fillet supplying means for feeding said fillets to be turned over and fillet discharging means for discharging the turned-over fillets toward further processing, wherein:
    a) said fillet supplying means includes guiding channel means having a longitudinal axis, arranged in an inclined manner for supporting the forward movement of the fillets by gravity from a starting end to a run-off end, and having two longitudinal edges opposing each other with a run-off edge along said run-off end terminating said longitudinal edges;
    b) said run-off edge starts from one of said longitudinal edges and extends forward and across to at least a proximity of the second one of said longitudinal edges thereby deviating from the shortest distance between two opposing points on said opposing longitudinal edges; and
    c) guiding face means are arranged adjacent said run-off edge at a predetermined distance thereto and extending essentially in the direction of said longitudinal axis of said guiding channel means, said guiding face means being arranged to extend underneath said guiding channel means when seen in the vertical dimension, and in an inclined manner.

2. An apparatus as claimed in claim 1, wherein, following the lower region of said guiding face means, conveying means are arranged forming said fillet discharging means, said conveying means being arranged to perform a conveying action in one of a traverse and a longitudinal direction with regard to said guiding face means.

3. An apparatus as claimed in claim 1, wherein said guiding face means forms part of a side-wall of a receiving chute extending in the direction of said guiding channel means and is inclined in the same sense as said guiding channel means.

4. An apparatus as claimed in claim 2, wherein said guiding face means forms part of a side-wall of a receiving chute extending in the direction of said guiding channel means and is inclined in the same sense as said guiding channel means.

5. An apparatus as claimed in claim 3, wherein said receiving chute has a cross-section having the shape of one of a semi-circle and an oval arch, and is formed as a flushing chute.

6. An apparatus as claimed in claim 4, wherein said receiving chute has a cross-section having the shape of one of a semi-circle and an oval arch, and is formed as a flushing chute.

7. An apparatus as claimed in claim 1, wherein said run-off edge is smooth without burrs.

8. An apparatus receiving fish fillets having opposite main surfaces for turning over the fish from one surface onto the other surface for orienting the fillets, comprising:
    guiding channel means having a longitudinal axis receiving and supporting the fish fillets on their said one surface and being inclined for supporting forward movement of the fish fillets by gravity from a first end to a run-off end, and having opposed side edges and a run-off edge extending along said run-off end between the side edges;
    said run-off edge extending in a direction of the forward movement of the fillets and across said guiding channel means from one of said side edges to at least adjacent the other of the side edges and having a length greater than the shortest distance between opposing points on each of said side edges; and
    guiding face means adjacent said run-off edge and spaced a predetermined distance therefrom for receiving fish fillets from said guiding channel means and supporting the fish fillets on their said other surface after the fish fillets are turned over across said run-off edge, said guiding face means extending essentially in the direction of said longitudinal axis of said guiding channel means.

9. An apparatus receiving fish fillets having opposite main surfaces for turning over the fish from one surface onto the other surface for orienting the fillets, the fish fillets having opposite ends, comprising:
    guiding channel means having a longitudinal axis receiving and supporting the fish fillets on their said one surface and being inclined for supporting forward movement of the fillets by gravity with one of said ends oriented forwardly with respect to the movement from a first end to a run-off end, and having opposed side edges and a run-off edge extending along said run-off end between the side edges;
    said run-off edge extending obliquely from one side edge to the other side edge across said guiding channel means to form the side edges with unequal lengths; and
    guiding face means adjacent a shorter one of the side edges and spaced a predetermined distance from said run-off edge so that a fish fillet supported on its said one main surface by said guiding channel means moves forwardly to overhang said run-off edge and make contact on its said other main surface with said guiding face means whereby further movement of the fish fillet results in the fish fillet being temporarily supported by both the guiding channel means and said guiding face means, and further so that when the fish fillet passes completely over the run-off edge of the guiding channel means, the fish fillet is turned-over and supported on the other main surface by said guiding face means, and said one end remains oriented forwardly with respect to a continued movement of the fish fillet along said guiding face means.

* * * * *